US011986863B2

(12) United States Patent
Schoettle et al.

(10) Patent No.: US 11,986,863 B2
(45) Date of Patent: May 21, 2024

(54) FLUID CONTROL DEVICE AND ASSOCIATED METHODS

(71) Applicants: Joseph D. Schoettle, Vero Beach, FL (US); Mark B. D'Souza, Mapusa (IN); Terry L. Garceau, Jr., Sebastian, FL (US)

(72) Inventors: Joseph D. Schoettle, Vero Beach, FL (US); Mark B. D'Souza, Mapusa (IN); Terry L. Garceau, Jr., Sebastian, FL (US)

( * ) Notice: Subject to any disclaimer, the term of this patent is extended or adjusted under 35 U.S.C. 154(b) by 424 days.

(21) Appl. No.: 17/346,376

(22) Filed: Jun. 14, 2021

(65) Prior Publication Data

US 2021/0299709 A1 Sep. 30, 2021

(51) Int. Cl.

| | |
|---|---|
| ***B05B 1/14*** | (2006.01) |
| ***B05B 9/01*** | (2006.01) |
| ***B05B 15/658*** | (2018.01) |
| ***B08B 3/02*** | (2006.01) |
| ***B08B 9/00*** | (2006.01) |
| ***E04D 13/076*** | (2006.01) |
| ***E04D 15/00*** | (2006.01) |

(52) U.S. Cl.

CPC ................ *B08B 3/024* (2013.01); *B05B 1/14* (2013.01); *B05B 9/01* (2013.01); *B05B 15/658* (2018.02); *B08B 3/026* (2013.01); *B08B 3/028* (2013.01); *B08B 9/00* (2013.01); *E04D 13/0765* (2013.01); *E04D 15/006* (2013.01); *B08B 2203/02* (2013.01)

(58) Field of Classification Search

None

See application file for complete search history.

(56) References Cited

U.S. PATENT DOCUMENTS

| | | | |
|---|---|---|---|
| 3,908,910 | A | 9/1975 | Detwiler |
| 4,182,497 | A | 1/1980 | Ferreira |
| 4,349,039 | A | 9/1982 | Egger |
| 4,750,883 | A | 6/1988 | Drake |
| 5,386,942 | A | 2/1995 | Dietle |
| 5,573,024 | A | 11/1996 | DeVaney |
| 5,725,322 | A | 3/1998 | Evans |
| 8,409,365 | B2 | 4/2013 | Cox |
| 9,114,417 | B2 | 8/2015 | Sakamoto |
| 2006/0289036 | A1 | 12/2006 | Hilton |

*Primary Examiner* — Levon J Shahinian

(74) *Attorney, Agent, or Firm* — Bullock Law; Stephen Bullock

(57) ABSTRACT

Embodiments of the present invention are related to a fluid control device for cleaning elevated channels including a top, a bottom, a first side, a second side, and a pair of angled exterior upper surfaces. The top includes a top aperture structured to receive tubing therein and the first side and second side include a spout respectively. The fluid control device is structured to receive fluid into the device top and direct that fluid out the first side and second side at downward side angles.

18 Claims, 6 Drawing Sheets

FLUID CONTROL DEVICE AND ASSOCIATED METHODS

FIELD OF THE INVENTION

The present invention relates to systems and methods for directing fluid expelled from a pressure washer or other water source. More particularly, the present invention relates to a fluid control device and associated methods.

BACKGROUND

Cleaning high up and hard to reach places like house gutters and elevated channels becomes a tedious and oftentimes dangerous job to those tasked with doing so. Typical gutter cleaning involves directing water through the gutter system to disperse accumulated material within the gutter. Many times, a worker will use a ladder along with a pressure washer or hose and risk losing their balance and falling from the ladder. Sometimes a worker will climb on a roof with a power washer and flush the gutters at a downwardly angle. This of course poses the risk of falling off of the roof.

There exists a need for a pressure washer system to control the direction and effective angle of fluid dispensation while safely and effectively cleaning house gutters and elevated channels.

This background is provided to reveal information believed by the applicant to be of possible relevance to the present invention. No admission is made as to prior art and nothing within the background should be construed as prior art against the present invention.

SUMMARY OF THE INVENTION

Embodiments of the present invention are related to a fluid control and directional device including a top, a bottom, a first side, a second side, and a pair of angled exterior upper surfaces. The top may include a top aperture structured to receive piped tubing therein and the first side and second side may include a spout respectively. The fluid control device may be structured to receive fluid into the device top and direct that fluid out the first side and second side at a downwardly angle. In this embodiment the medial base may include a pair of pleated arches. Furthermore, the medial base may be metal and the first and second side casing may be plastic. Additionally, the first and second side casing may be removably engaged with the medial base. The first side casing and the second side casing may form an arcuate bottom. The directed downward angle of fluid and arcuate bottom may be structured to facilitate navigation of the fluid control device This embodiment may further include the medial base, the first side casing and second side casing with inner side channels structured to removably accommodate a pair of downwardly angled spouts. Furthermore, the medial base may include a first base side and a second base side that taper from the pleated arches to the medial base flat bottom surface.

Some embodiments of the invention may include a fluid control device including a medial base, a first side with a first side casing, and a second side with a second side casing whereby the first side casing and second side casing removably attach to the medial base. The fluid control device may also be structured to receive water into the top of the medial base and direct water out of the first side and second side at downward angles.

In this embodiment, the first side, second side and medial base may house a triad of connected inner passageways structured to intake a downward waterflow into the device top, ramp up water pressure via narrowed inner passageways, and expel redirected waterflow with ramped up water pressure out from within the first and second side. Furthermore, the first side casing and second side casing may include angled exterior upper surfaces that connect to and partially envelop an upper portion of the medial base. Additionally, the first side casing and second side casing may each envelope a bottom portion of the medial base to form a curved outer bottom surface.

This embodiment may include the medial base with an upper base platform, a pair of pleated arches, and sides that taper from the pleated arches to the medial base bottom. The pleated arches may include at least one flat surface on opposing sides of the medial base structured as a flat connection surface for upper fastening members. Additionally, the pleated arches may form a plurality of planes that may geometrically correspond to a plurality of angled inner surfaces of the first side casing and second side casing to form a friction fit therebetween. Furthermore, the medial base may include a base flat bottom surface structured to provide a flat connection surface for bottom fastening members. In this embodiment, the medial base, the first side casing, the second side casing, and inner spouts may be removably engaged to form a modular fluid control device. Also, the downward angled spouts within the first side and second side may be structured to create spray fans with upward lift when operated with a pressurized fluid delivery system.

Other embodiments of the fluid control device may include a medial base, a first side with a first side casing and a second side with a second side casing whereby the first side casing and second side casing removably attach to the medial base. The medial base may include an upper base platform, a pair of pleated arches, and sides that taper from the pleated arches to the medial base bottom. Furthermore, the medial base, the first side casing and second side casing may house a triad of connected inner passageways structured to intake a downward waterflow into the device top, ramp up water pressure via narrowed inner channels, and expel redirected waterflow with ramped up water pressure out from within the first and second side of the medial base at downward angles ranging from 1-60 degrees to the horizontal. Additionally, the medial base, the first side casing, the second side casing, and inner spouts may be removably engaged to form a modular fluid control device with a curved outer bottom surface.

In this embodiment, the medial base may be made of metal and the first side casing and second side casing may be made of plastic. The first side casing and second side casing may be removably attached to the medial base by at least one of friction fitting and attachment members.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "top" "bottom" "right" "left" and other like terms are used for the convenience of the reader in reference to the drawings. Additionally, the description may contain terminology to convey position, orientation, and direction without departing from the principles of the present invention. Such positional language should be taken in context with the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
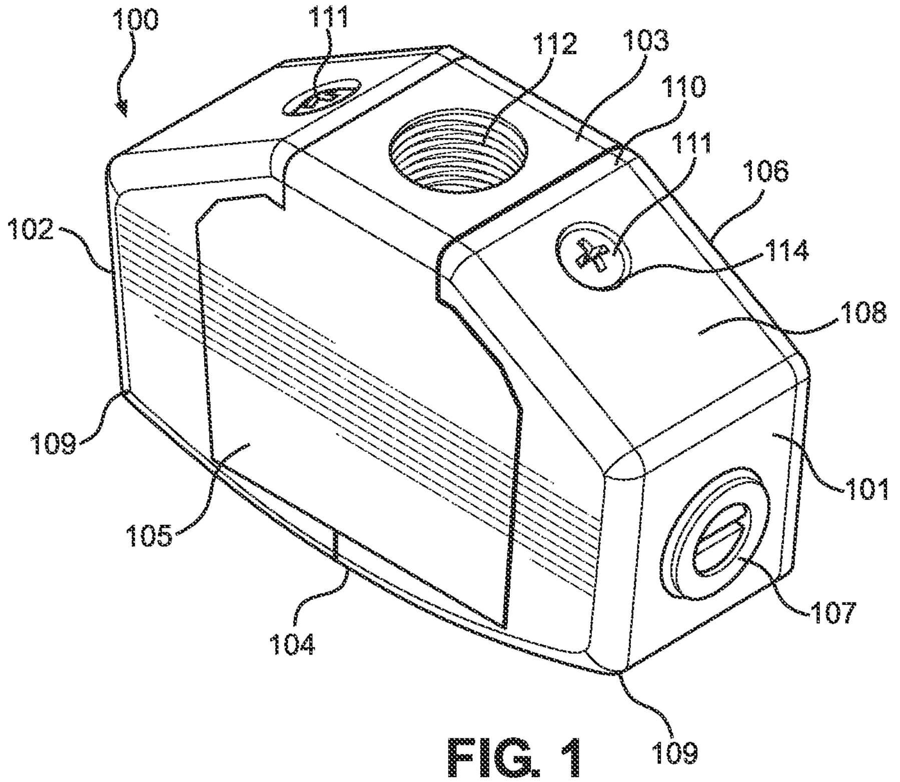
FIG. 1 is a front perspective view of a fluid control device according to an embodiment of the invention.

Referring to FIG. 1, a fluid control and directional device 100, hereinafter the device 100, will be described in more detail. The device 100 may include a top 103, a bottom 104, a first side 101, a second side 102, a front 105 and a back 106. The bottom 104 may be a convex surface extending from the device first side 101 to the second side 102. The device first side 101 and second side 102 may generally be square or rectangular and may extend upwardly from the device bottom 104 at angles slightly deviated outward from 90 degrees with respect to the device bottom corners 109. By way of non-limiting example, the device first side 101 may be angled at 91-150 degrees, for example 100 degrees, with respect to the bottom corner 109 when viewing the device 100 from the front 105. Likewise, the device second side 102 may be angled at approximately 80 degrees with respect to the bottom corner 109 when viewing the device 100 from the front 105. However, one skilled in the art will appreciate that the deviation from 90 degrees may be more or less depending on need, preference and circumstance. Additionally, each side 101, 102 may include an opening with a spray nozzle 107 therethrough.

Atop each side 101, 102 may be an angled exterior upper surface 108 extending from the respective side 101, 102 to a point proximate the top 103. Using the top 103 as a reference plane, the exterior upper surfaces 108 may extend downward at angles to the first side 101 and to the second side 102 when viewing the device from the front 105. By way of non-limiting example, these angles may be approximately 210 degrees and approximately 330 degrees respectively. However, one skilled in the art will appreciate that these angles may be more or less depending on need, preference and circumstance.

Each respective exterior upper surface 108 may be attached to level connecting surfaces 110 that may abut the top 103. Furthermore, within each angled exterior upper surface 108 may be a respective upper fastening member 111 removably engaged with the device 100 through upper apertures 114 therein. Likewise, the device top 103 may include a top base aperture 112.

Figure 2:
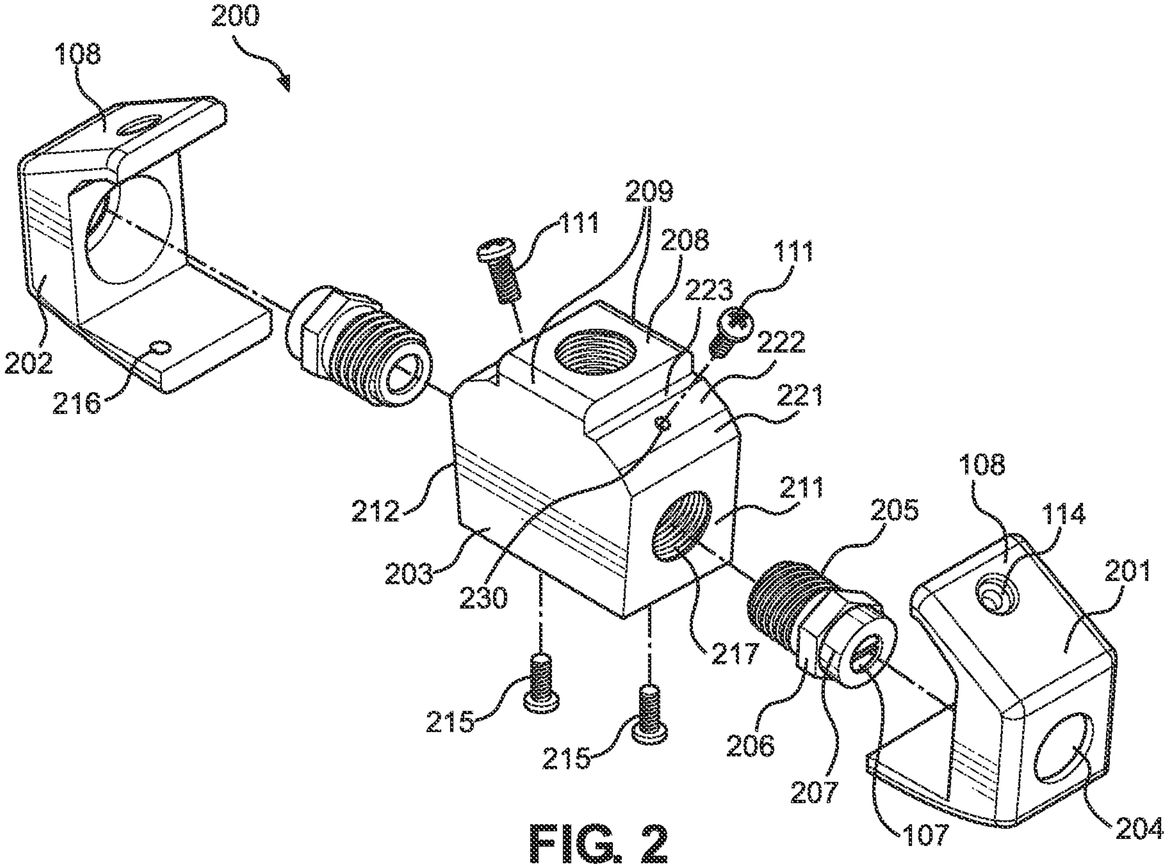
FIG. 2 is an isometric perspective exploded view of the fluid control device shown in FIG. 1.

FIG. 2 illustrates a componentry breakdown of the device 100 showing the fluid control device assembly 200. As shown, there may be a first side casing 201 and a second side casing 202 on opposing sides of a medial base 203. The side casings 201, 202 may include a nozzle aperture 204 structured to allow a spout 205 to protrude therethrough. The side casings 201, 202 may be attached to the medial base 203 via upper fastening members 111 on the angled exterior upper surfaces 108 and bottom fastening members 215 at the bottom 104. By way of non-limiting example, the fastening members 111, 215 may be screws that may fit through upper apertures 114, upper base apertures 230, bottom apertures 216 and bottom base apertures.

The spout 205 may be a threaded elongate member with a spout ridge 206, a permeating spout extension 207 and a spray nozzle 107 at one end. Each respective spout ridge 206 may fit flush against an inside portion of the side casings 201, 202 while the permeating spout extensions 207 allow for the spray nozzle 107 to fit through the nozzle aperture 204 and face outwardly from the first and second sides 101, 102.

Threading may allow for each respective spout 205 to removably engage with threaded side base channels 217 in a first base side 211 and a second base side 212 respectively. Atop each base side 211, 212 may be a first angled upper plane 221, a second angled upper plane 222, and a third level upper plane 223. The combination of these three planes 221, 222, 223 may create a generally arcuate, yet pleated surface on the medial base 203 extending from the base sides 211, 212 to an upper base platform 208. The upper base platform 208 may be a generally square or rectangular top platform of the medial base 203 with radius filleted front and back edges 209 at the respective front 105 and back 106 of the device 100.

Figure 3:
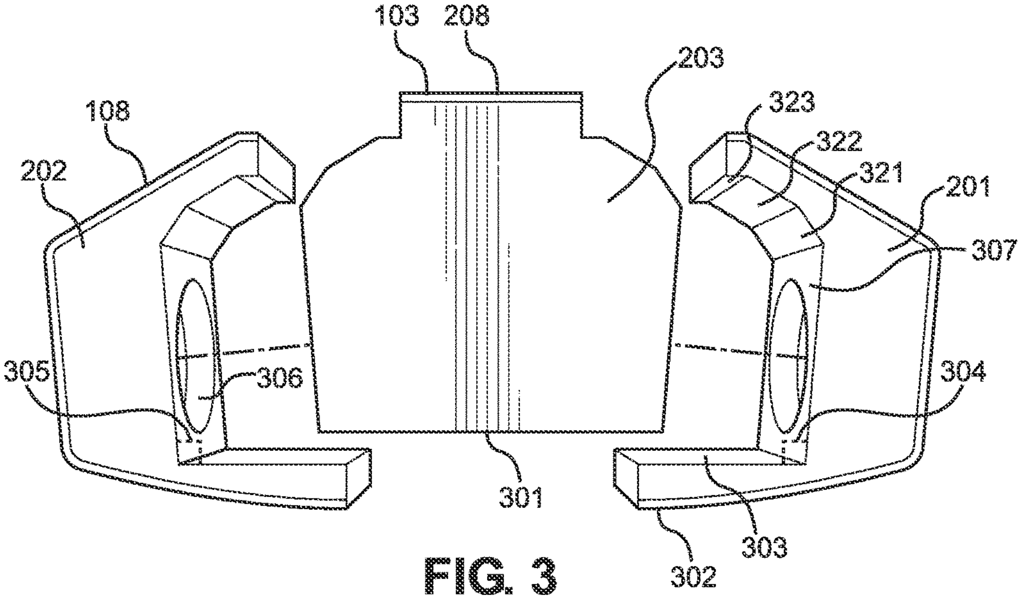
FIG. 3 is a front separated view of the fluid control device shown in FIG. 1.

FIG. 3 is a front separated view of the device 100 illustrating some additional features of the first and second side casings 201, 202 as well as the medial base 203. By way of non-limiting example, the side casings 201, 202 may be made of lightweight material such as polycarbonate, plastic or the like, and the medial base 203 may be made of metal. However, one skilled in the art will appreciate that the side casings and the medial base may be made out of plastic or metal. In some embodiments, the configuration of plastic side casings 201, 202 with a metal medial base 203 may provide an optimal weight and a balanced device 100. The plastic side casings 201, 202 may make the device lighter in weight, while the metal medial base 203 may allow for optimized center of gravity with sturdy connections and stable waterflow through an integral portion of the device

100. Lighter weight may allow for the device 100 to be used for longer periods of time without user fatigue. Furthermore, a sturdy medial base 203 may provide for a safer construction able to receive and disperse higher loads of water pressure. This may assist with preventing unexpected detachment of the device 100 during use thereby preventing user injury.

This figure illustrates that the medial base 203 may have a flat bottom surface 301 whereas the device 100 may have a curved bottom surface 302. This is because each side casing 101, 102 not only has a flat inner bottom surface 303 to fit flush against the flat bottom 301 of the medial base 203, but also a curved outer bottom surface 302. When attached to the medial base 203, the combination of the curved outer bottom surfaces 302 of the side casings 101, 102 creates a complete arced surface along the bottom 104 of the device 100.

Within the side walls 307 of each side casing 101, 102 may be side casing channels 306 sized to accommodate spouts 205 therein. The side casing channels 306 may be angled downwards with respect to the top 103. Furthermore, each side wall 307 may be oriented with an outward angle with respect to the corners of the flat inner bottom surface 303. In some embodiments, the first side casing 201 may have a side wall 307 that is angled at approximately 95 degrees when viewing the device 100 from the front 105. Likewise, the second side casing 202 may have a side wall 305 that is angled at approximately 85 degrees when viewing the device 100 from the front 105. However, one skilled in the art will appreciate that these angles may be more or less depending on need, preference and circumstance.

Atop each respective side wall 307 may be a first angled inner surface 321, a second angled inner surface 322, and a third level inner surface 323. The first angled inner surface 321 may share the same angle as the first angled upper plane 221 of the medial base 203. Furthermore, the second angled inner surface 322 may share the same angle as the second angled upper plane 222 and the third level inner surface 323 may be dimensioned similar to the third level upper plane 223. Sharing these angles and dimensions may allow for the first and second side casings 201, 202 to snugly fit overtop of the medial base 203 and abut the upper base platform 208. Providing this type of fitting not only adds friction to secure the side casings 201, 202 to the medial base 203, but also provides a flat attachment surface for the upper fastening members 111 to secure the side casings 201, 202 to the medial base 203. Additionally, the interior structure of the side casings 201, 202 along with the angled exterior upper surfaces 108 and the angled side casing channels 306 provides for a secure downwardly angled spout 205 to fit therein with respect to the top 103 of the device 100.

Figure 4A:
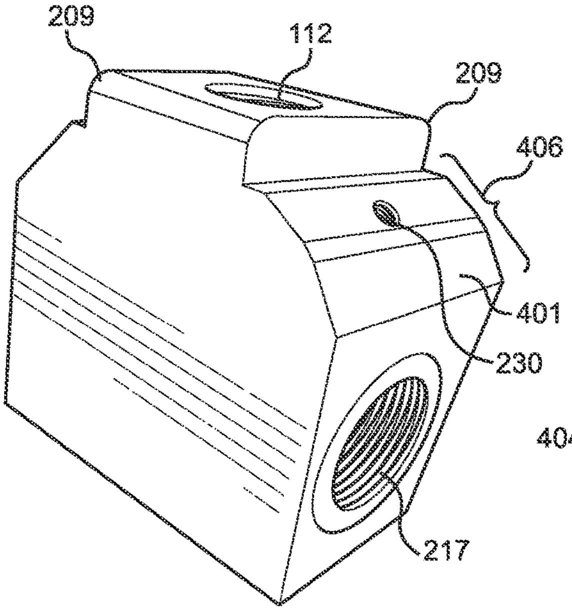
FIG. 4A is a perspective view of a middle base of the fluid control device shown in FIG. 1.
Figure 4B:
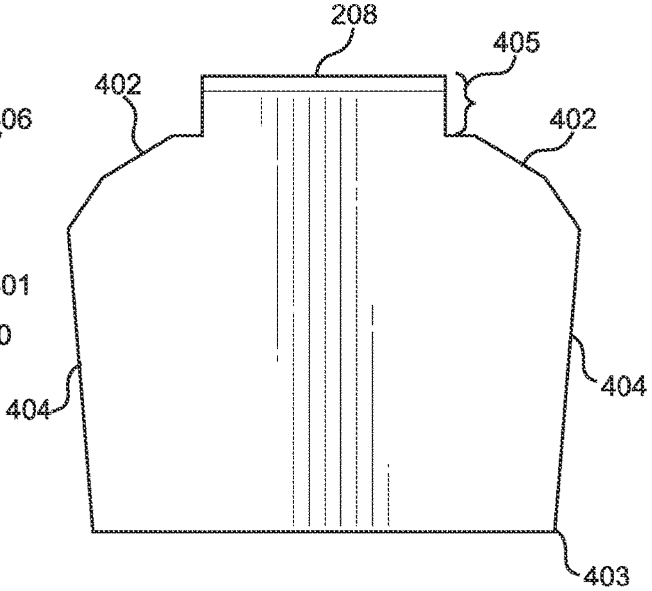
FIG. 4B is a front view of the middle base shown in FIG. 4A.

FIGS. 4A and 4B emphasize structural features of the medial base 203. More particularly, the side base channel 217 may include threading to removably accommodate the spout 205 therein. Furthermore, these figures clearly show that the medial base 203 includes arcuate upper shoulders 402 consisting of flat surfaces 401 arranged to form a pleated arch 406 between the base sides 211, 212 and the upper base platform 208. Furthermore, the base sides 211, 212 may taper 404 from the arcuate upper shoulders 405 to the base bottom corners 403. This taper 404 of the base sides 211, 212 along with an angled side base channel 217 provide additional structural support to secure and angle the spouts 205. Also shown is that the upper base platform 208 is raised distally from the body of the medial base 203 via distal extension 405 with radius filleted edges 209.

Figure 5:
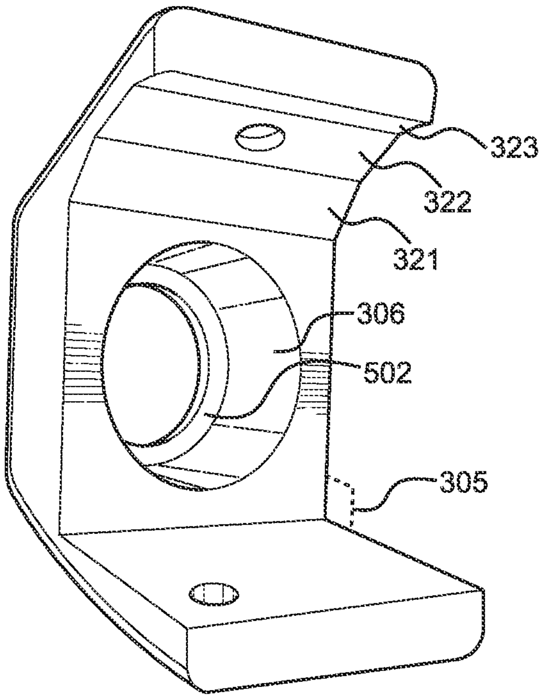
FIG. 5 is a perspective view of a side casing of the fluid control device shown in FIG. 1.

FIG. 5 shows the internal structure of the side casings 201, 202 including an interior view of the side casing channel 306 along with a spout resting surface 502. The spout resting surface 502 may be a ridge on the interior of the side walls 307 giving the spout 205 additional leverage within the device 100. Furthermore, the angles 305 of the side walls 307 are shown along with an inside view of the first angled inner surface 321, the second angled inner surface 322, and the third level inner surface 323. Also shown are an interior view of the upper and bottom apertures 216 used to receive upper and bottom fastening members 111, 215 therein.

Figure 6:
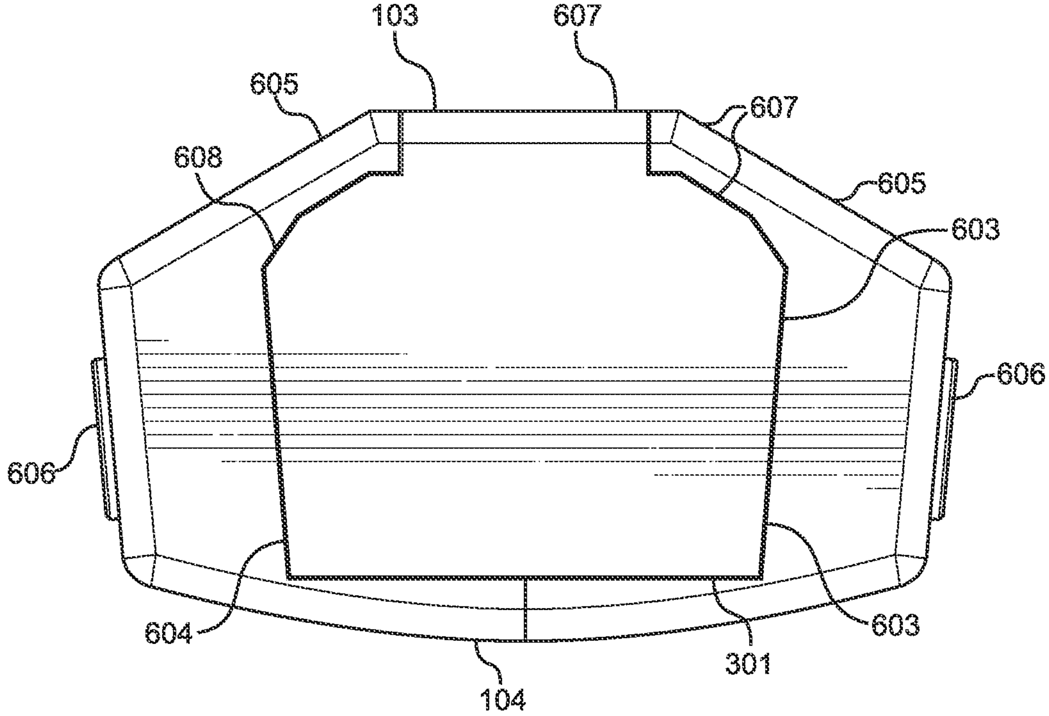
FIG. 6 is a front view of the fluid control device shown in FIG. 1.

FIG. 6 illustrates a front view of a completely attached fluid control assembly 200 forming the completed device 100. Of particular importance to note is how the angles of each component compliment one another and make for a more stable device 100. The pleated arches 411 of the medial base 203 form a friction fitting with the side casings 201, 202. Furthermore, the second angled upper plane 222 of the medial base 203 in conjunction with the second angled inner surface 322 of the side casings 201, 202 and the angled exterior upper surface 108 all harmonize to form a solid flat upper connection surface 607 to firmly secure the side casings 201, 202 to the medial base 203 via the upper fastening members 111. Furthermore, the level top 103 allows for a flat connection surface 607 of a downwardly angled connection passageway and the base flat bottom 301 allows for a flat connection surface 607 for the bottom fastening members 215. Additionally, the acute and obtuse angles 603, 604 of the base sides 211, 212 in conjunction with the complimentary angles 606 of the side casing channels 306 and the downwardly angled casing tops 605 all work in tandem to provide a very secure device 100 capable of directing high pressure fluid efficiently and firmly.

Figure 7:
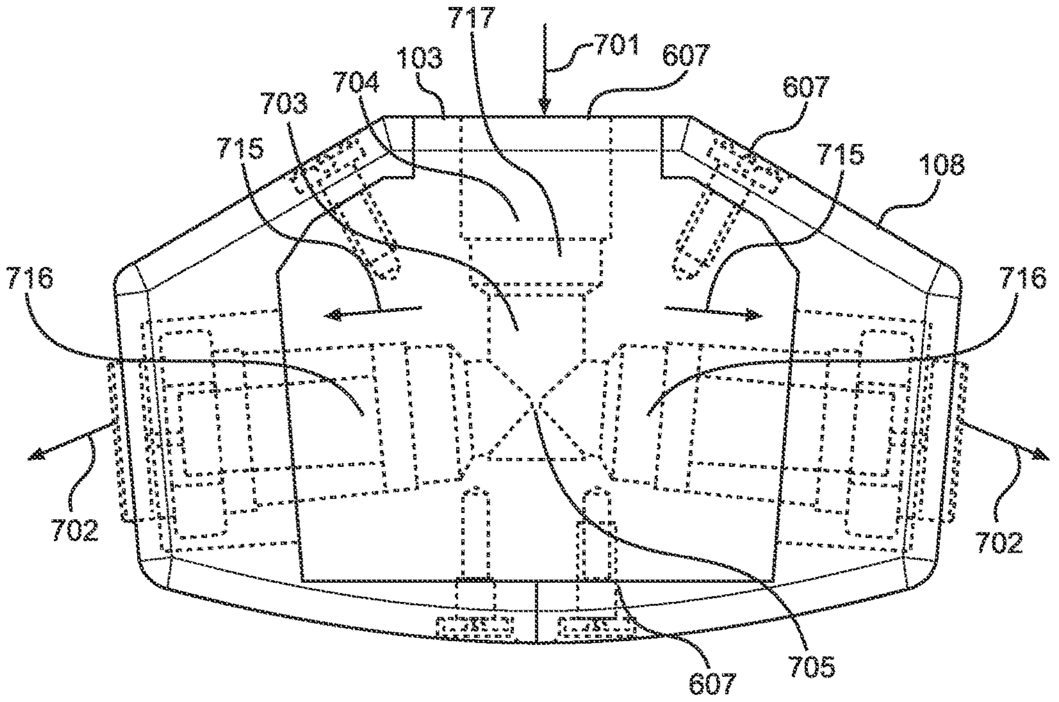
FIG. 7 is a front interior view of the fluid control device shown in FIG. 1.

FIG. 7 illustrates the internal componentry of the device with directed waterflow. In particular, at the device top 103 may be a top connection port 704. The top connection port 704 may be structured to accommodate a threaded extension from a pressure washer. In some embodiments, this threaded extension may be a u-shape piped tube to orient the initial waterflow into the device 100 as downward waterflow 100. The downward waterflow 701 may enter the device through the top connection port 704 and pass through narrower connecting channels 703 that serve as a central hub 705 for dispersing the fluid through the first and second sides 101, 102 of the device 100. As shown, the side angled waterflow 702 may expel from the sides 101, 102 at downward optimized side angles 715 with respect to the downward waterflow 701. In some embodiments these downward optimized side angles 715 may range from 1-60 degrees from horizontal. The Downward waterflow 701 may be redirected at the downward optimized side angles 715 with respect to vertical and the spout 205 and may divide the water pressure from the downward waterflow 701 that can be detrimental to a pressurized device. The central hub 703 may be a junction whereby the central internal channel 717 is split into two side internal channels 716 that may be slightly deviated from 90-degrees. However, in some embodiments, the side angled waterflow 702 may be expelled at angles of 91-150 degrees and 210-269 degrees respectively. By way of non-limiting example, this may be approximately 91 degrees and 210 degrees respectively. This may facilitate optimized debris cleaning and may provide an upward thrust that counteracts the weight of the device 100 when attached to a spray assembly. As a result, the device 100 may have highly enhanced stability when extended overhead of a user. Enhanced stability facilitates cleaning multi-story gutters and channels, promotes efficiency, and saves user energy. It further prevents the device 100 from riding the floor of a gutter or channel thereby reducing friction between the respective surfaces.

The central hub 705 may divide the downward waterflow 701 into the two side angled waterflows 702. Furthermore, in some embodiments because the central hub 705 has narrower connecting channels 703 than the top connection port 704, the water pressure may be ramped up when passing therethrough. This may facilitate the dispersal and ultimate expulsion of the side angled waterflow 702 with enough force to be effective. Therefore, the force that may be lost by dividing the water at the central hub 705 may be regained by the narrower connecting channels 703.

Put differently, the medial base 203, the first side casing 201 and second side casing 202 house a triad of connected inner passageways 704, 703, 205 structured to intake a downward waterflow 701 into the device top 103 via narrowed inner channels 703 with downward optimized side angles 715, and expel the redirected waterflow out from within the first side 101 and second side 102.

FIG. 7 also clearly demonstrates the flat connection surfaces 607 brought about by the specific angle structure of the device 100. As shown, the top connection port 704 allows for a flat connection surface 607 between the pressure washer extension and the device top 103. This flat connection surface 607 allows for the device 100 to be held at the proper angle to bring about the downward side angled waterflow 702. Furthermore, the angled exterior upper surface 108 allows for a flat connection surface for the upper fastening members 111. Lastly, because the medial base 203 has a flat bottom 301, the bottom fastening members 215 may engage the medial base 203 with a flat connection surface 607.

Figure 8A:
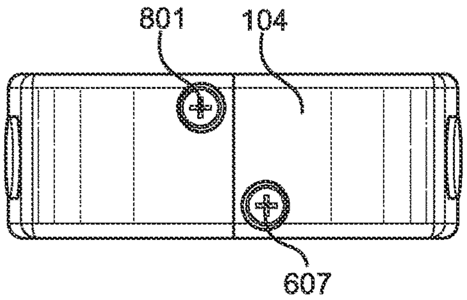
FIG. 8A is a bottom view of the fluid control device shown in FIG. 1.
Figure 8B:
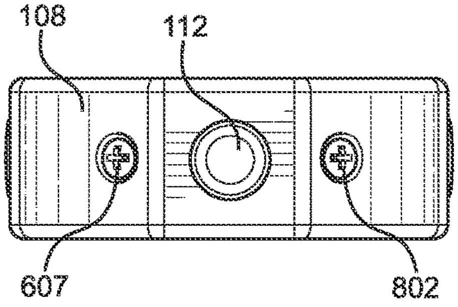
FIG. 8B is a top view of the fluid control device shown in FIG. 1.

FIGS. 8A and 8B show the device bottom 104 and top 103 respectively. FIG. 8A illustrates that the bottom fastening members 215 may be asymmetric connectors 801 offset at opposing sides on the device bottom 104. Furthermore, FIG. 8B shows that the upper fastening members 111 may be symmetrically positioned atop the angled exterior upper surface 108. Additionally, the top base aperture 112 is clearly shown in vertical alignment with a central axis of the device facilitating a flat connection with an external pressure washer connecting tube.

Figure 9A:
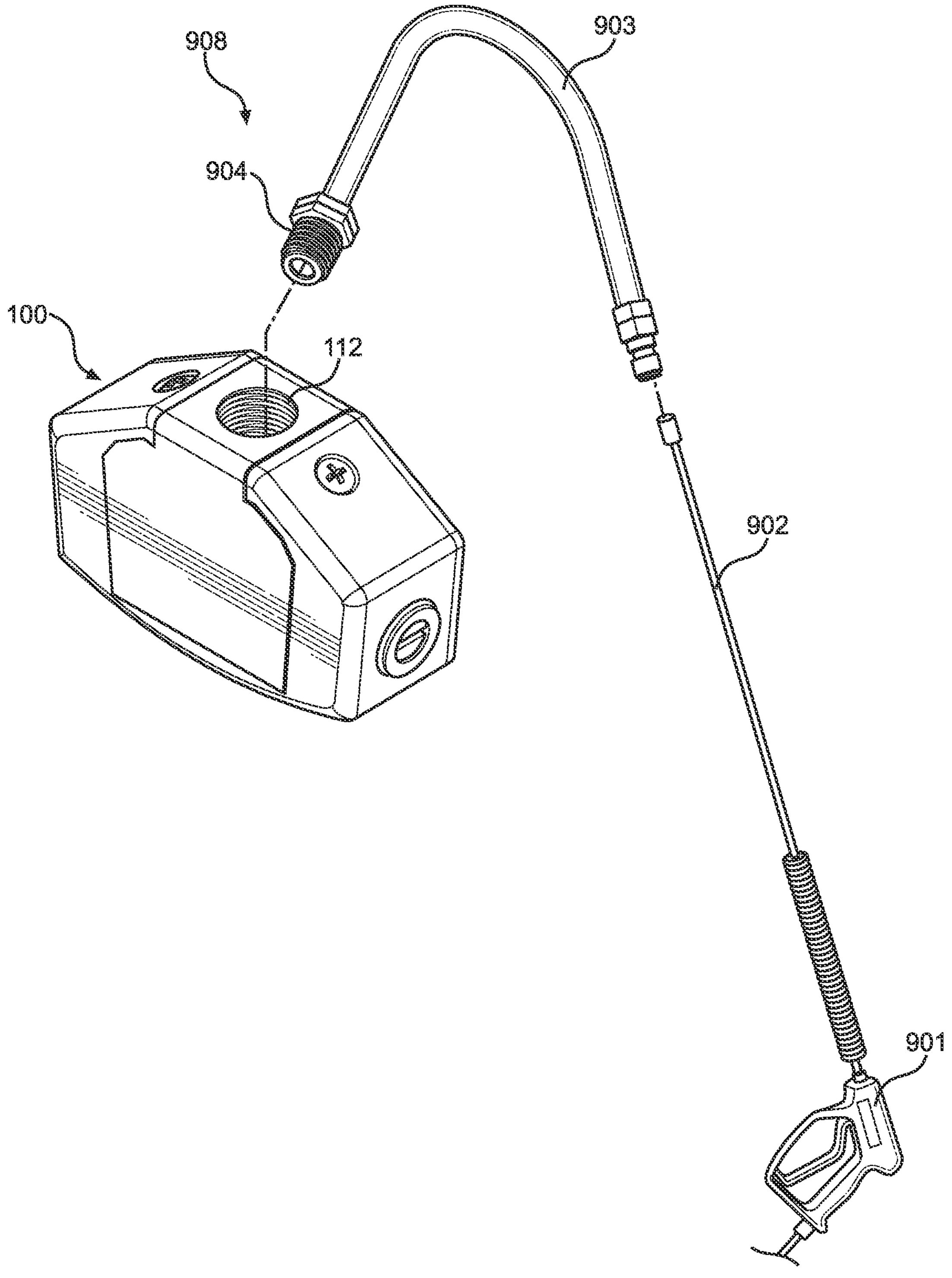
FIG. 9A is a segmented environmental view of the fluid control device shown in FIG. 1.

FIG. 9A illustrates the type of connecting tube that may be used with the device in the form of curved tubing 903. As shown, the curved tubing 903 may be a u-shape piped tube with threading on opposing ends. One threaded end may connect to a pressure washer extension member 902 and the other may connect to the top base aperture 112 of the device 100. Because the u-shape piped tube curves downward when attached, it is able to redirect an upward water flow overtop and down into a gutter system. A pressure washer trigger gun 901 may be connected to the pressure washer extension member 902 to complete the entire assembly.

Figure 9B:
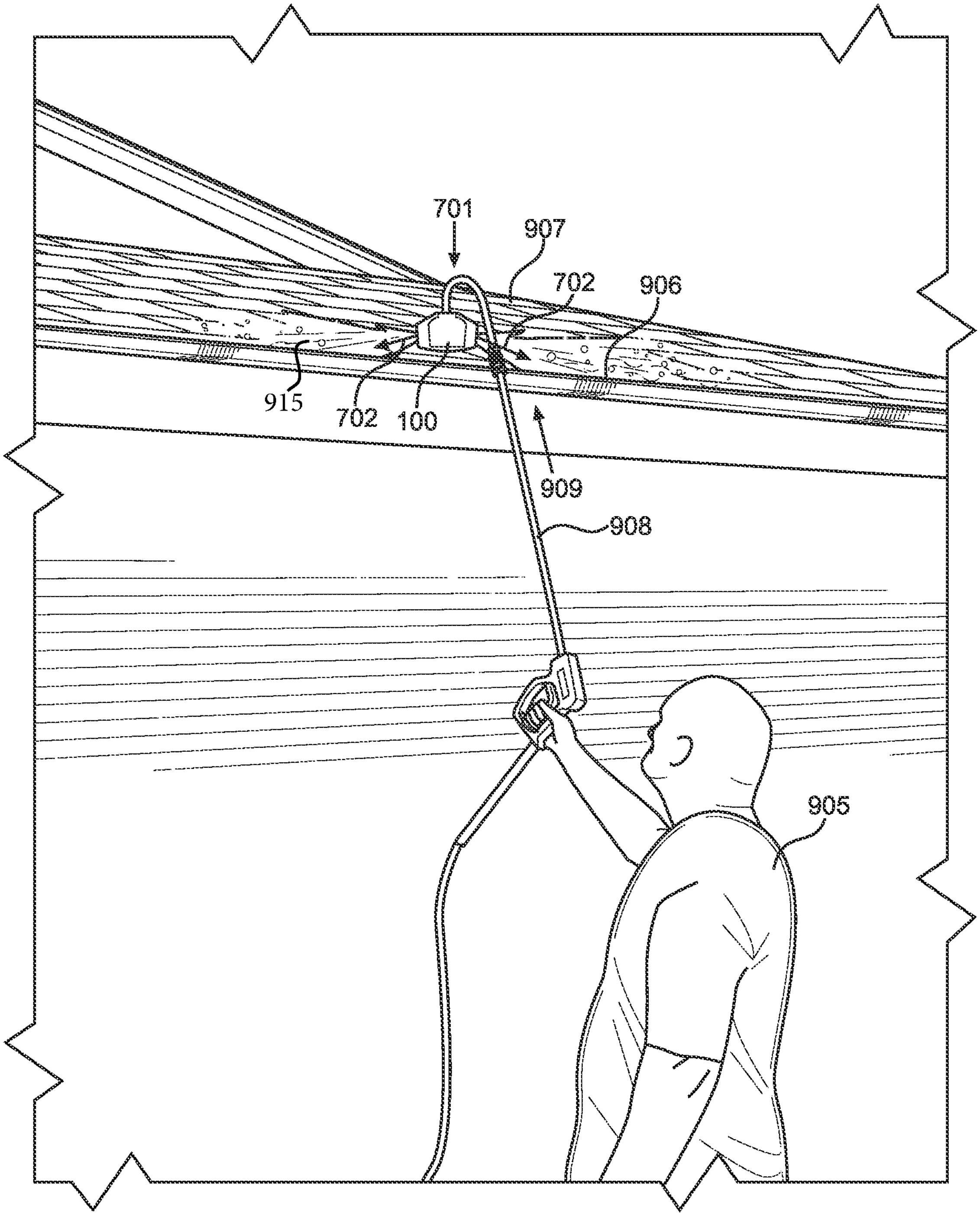
FIG. 9B is an environmental view of the fluid control device shown in FIG. 1.

FIG. 9B shows an embodiment whereby a user 905 is operating the device 100 with a pressure washer system 908. The extension member 902 and the u-shape piped tube 903 may allow for the device 100 to be placed up and over a gutter 906 on the side of a building roof 907. As shown, the waterflow may be directed upward 909 along the pressure washer extension member 902 around the u-shape piped tube 903 and back downward 701 into the device 100 before being distributed out the device sides 101, 102. The side angled waterflow 702 is forced out at a downwardly angle to disperse the accumulated material in the gutter 906. In some embodiments, this downwardly angle may be between 1 and 60 degrees with respect to horizontal.

In addition to the curved outer bottom surface 302, the optimized side angled waterflow 702 provides an upward thrust thereby increasing the stability of the device 100. This upward thrust is the direct result of the optimized angle of the side angled waterflow 702. This upward thrust that comes from the two side internal channels 716 also reduces friction from the device riding the floor of the gutter 906. The combination of the upward thrust and curved outer bottom surface 104 enables the device 100 to smoothly glide laterally and hence make it easier for the user 905 to maneuver the device 100 within a gutter 906 as opposed to a flat device bottom. The profiled outer faces may ensure that the device 100 does not catch onto spikes, obstructions or gutter supports often encountered during cleaning. This may result in easier gutter cleaning and a reduction of operator fatigue. It may also prevent cleaning stoppages due to a device 100 trapped or caught in an obstruction.

The structural advantages of the device 100 lead to functional advantages over traditional methods. By way of non-limiting example, because the spouts 205 are contained within a protective housing they are more apt to last longer. The fact that the device 100 is modular means that different parts can be replaced without replacing the entire device 100. Furthermore, the fact that there is a curved outer bottom surface 302 means that the apparatus may better navigate the inside bottom of a gutter 906 without causing clogs or getting caught.

When connected to a pressurized fluid delivery system the device's 100 downwardly angled spray 702 on either side of the device 100 is structured to reach the floor of gutters and elevated channels. Although downwardly angled, the spray configuration is constructed to direct water in opposite directions, yet generally parallel with the longitudinal pathway of gutters 906 and elevated channels being cleaned.

The downwardly angled spouts 205 when operated with a pressurized fluid delivery system 908 may allow fluid spray fans 915 to effectively clear debris from gutters 906 and elevated channels. Furthermore, the spray fans 915 may create upward lift on the device 100. In combination with the arcuate bottom 104 may allow for the device 100 to be lighter and more easily maneuvered by a user.

The removable nature of the downwardly angled spouts 205 on either side 101, 102 may allow for modular replacement of components, as well as facilitate device maintenance. Furthermore, the congruent componentry with complimentary angles enables the device 100 to be free of moving parts. Additionally, the uniformly smooth exterior assists with preventing device snags. Both of these factors contribute to a longer device lifetime and easier maintenance.

That which is claimed is:

1. A fluid control device comprising
a top;
a bottom;
a first side;
a second side; and
a pair of angled exterior upper surfaces;
wherein the top comprises a top aperture configured to receive tubing therein;
wherein the first side and second side comprise a spout respectively;
wherein the fluid control device comprises a first side casing and a second side casing removably attached to a medial base;
wherein the first side casing and second side casing form a congruent fitting with each respective exterior side of the medial base;

wherein the fluid control device is configured to receive fluid into the device top and direct that fluid out the first side and second side at a downward angle.

2. The fluid control device of claim 1 wherein the medial base is metal and the first side casing and second side casing are plastic.

3. The fluid control device of claim 1 wherein the medial base includes a pair of pleated arches.

4. The fluid control device of claim 1 wherein the medial base, the first side casing and second side casing include inner side channels configured to removably accommodate a pair of downwardly angled spouts.

5. The fluid control device of claim 1 wherein the first side casing and the second side casing form an arcuate bottom; and wherein the directed downward angle of fluid and arcuate bottom are configured to facilitate navigation of the fluid control device.

6. The fluid control device of claim 1 wherein the medial base includes a first base side and a second base side that taper from pleated arches to a base flat bottom.

7. A fluid control device comprising a medial base;

a first side with a first side casing; and a second side with a second side casing;

wherein the first side casing and second side casing removably attach to the medial base;

wherein the first side casing and second side casing form a congruent fitting with each respective exterior side of the medial base; and wherein the fluid control device is configured to receive water into the top of the medial base and direct water out of the first side and second side at downward angles.

8. The fluid control device of claim 7 wherein the medial base, the first side casing and second side casing house a triad of connected inner passageways configured to intake a downward waterflow into the device top, ramp up water pressure via narrowed inner channels, and expel redirected waterflow with ramped up water pressure out from within the first side and second side.

9. The fluid control device of claim 7 wherein the first side casing and second side casing include angled exterior upper surfaces that connect to and partially envelop an upper portion of the medial base.

10. The fluid control device of claim 7 wherein the first side casing and second side casing each envelope a bottom portion of the medial base to form a curved outer bottom surface.

11. The fluid control device of claim 7 wherein the medial base includes an upper base platform, a pair of pleated arches, and sides that taper from the pleated arches to the medial base bottom.

12. The fluid control device of claim 11 wherein the pleated arches comprise at least one flat surface on opposing sides of the medial base configured as a flat connection surface for upper fastening members.

13. The fluid control device of claim 11 wherein the pleated arches form a plurality of planes that geometrically correspond to a plurality of angled inner surfaces of the first side casing and second side casing to form a friction fit therebetween.

14. The fluid control device of claim 7 further including downward angled spouts within the first side and second side that are configured to create spray fans with upward lift when operated with a pressurized fluid delivery system.

15. The fluid control device of claim 7 wherein the medial base, the first side casing, the second side casing, and inner spouts are removably engaged to form a modular fluid control device.

16. A fluid control device comprising a medial base;

a first side with first side casing; and a second side with second side casing;

wherein the first side casing and second side casing removably attach to the medial base;

wherein the medial base includes an upper base platform, a pair of pleated arches, and sides that taper from the pleated arches to the medial base bottom;

wherein the medial base, the first side casing and second side casing house a triad of connected inner passageways configured to intake a downward waterflow into the device top, ramp up water pressure via narrowed inner channels, and expel redirected waterflow with ramped up water pressure out from within the first side casing and second side casing at downward angles; and wherein the medial base, the first side casing, the second side casing, and inner spouts are removably engaged to form a modular fluid control device.

17. The fluid control device of claim 16 further comprising a curved outer bottom surface.

18. The fluid control device of claim 16 wherein the medial base is made of metal and the first side casing and second side casing are made of plastic; and wherein the first side casing and second side casing are removably attached to the medial base by at least one of friction fitting and attachment members.

* * * * *